June 3, 1941.  A. C. HEISE ET AL  2,244,619
ELECTRIC TOASTER
Filed March 11, 1939
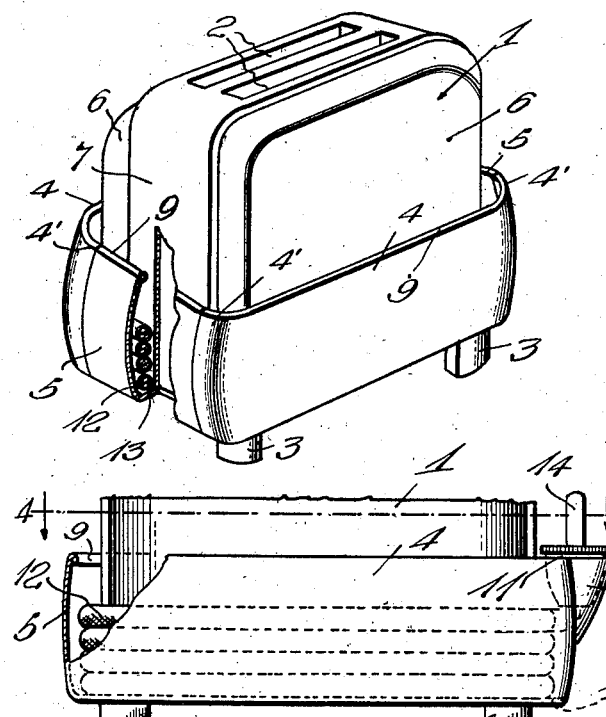
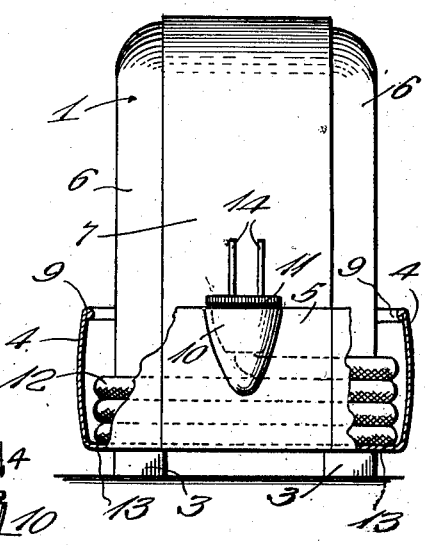
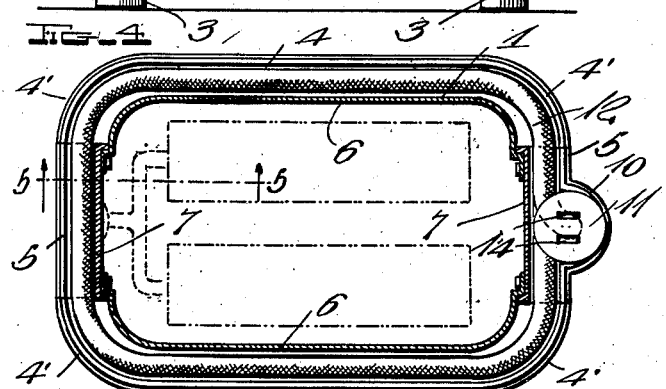
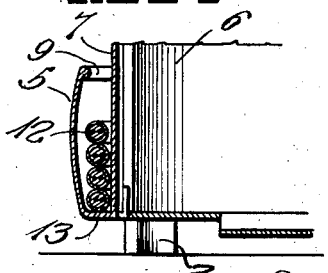
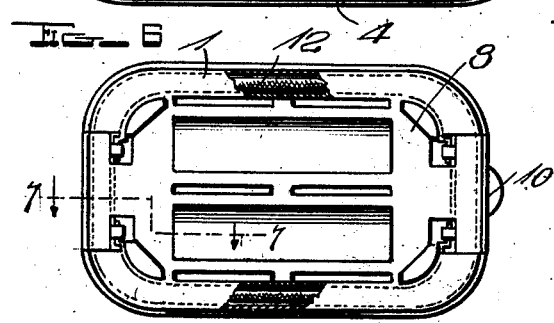
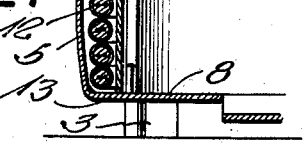
INVENTORS
ARTHUR C. HEISE,
MILLARD W. JACOB,
BY
*Jacobi Jacobi*
ATTORNEYS.

Patented June 3, 1941

2,244,619

UNITED STATES PATENT OFFICE 2,244,619

ELECTRIC TOASTER

Arthur C. Heise and Millard W. Jacobi,
Baltimore, Md.

Application March 11, 1939, Serial No. 261,326

3 Claims. (Cl. 242—129)

This invention relates to an electric toaster and more particularly to a toaster having means associated with it for securing a power cord about the toaster when the toaster is not in use.

At the present time it is a problem what to do with the power cord when a toaster is to be put away after being used. Many persons wrap the cord about the toaster where it will be out of the way but since there is nothing provided for retaining the cord wrapped about the toaster it slips off of the toaster or becomes unwound therefrom and becomes tangled with other articles when the toaster is put away.

Therefore one object of the invention is to provide a toaster with means carried by the toaster and serving very effectively to hold the cord in place after it has been wound about the toaster while at the same time permitting the cord to be easily unwound when the toaster is to be used.

Another object of the invention is to provide the toaster with cord holding means which is formed integral therewith and of such formation that it extends entirely about the toaster and provided a cord receiving trough or channel open at its top so that the cord may be easily slipped into the channel as it is wound about the toaster.

Another object of the invention is to provide the cord holder with means constituting a pocket into which the terminal plug of the cord is adapted to be thrust and thus hold the plug to prevent loosening of the cord and in addition dispose the plug in such position that it may be easily grasped when the cord is to be unwound for use.

Another object of the invention is to provide the toaster with cord holding means which will add to the appearance of the toaster instead of being unsightly.

Still another object of the invention resides in providing a device which is simple and durable in construction, inexpensive to manufacture and one which will be very efficient in operation and application to use.

With these and numerous other objects in view, our invention consists in the novel features of construction, combination and arrangement of parts as will be hereinafter referred to and more particularly pointed out in the specification and claims.

The invention is illustrated in the accompanying drawing wherein:

Figure 1 is a perspective view of a toaster provided with the improved cord holder, portions being shown in section;

Figure 2 is an end elevation of the toaster with portions of the cord holder broken away and shown in section;

Figure 3 is a view showing the lower portion of the toaster in side elevation with the cord holder partially in section;

Figure 4 is a view taken along the line 4—4 of Figure 3, the interior mechanism of the toaster being omitted;

Figure 5 is a sectional view taken along the line 5—5 of Figure 4;

Figure 6 is a bottom plan view of a toaster having a modified form of cord holder; and Figure 7 is a sectional view taken along the line 7—7 of Figure 6.

The toaster which is indicated in general by the numeral 1 is of a conventional construction and of the type wherein the bread to be toasted is thrust down into the toaster through the slots 2 at the top of the toaster and ejected or removed from these slots when toasted. The usual feet 3 are provided for supporting the toaster in an elevated position and it will be understood that the usual toasting mechanism will be provided within the toaster. The toasting mechanism has not been illustrated in the sectional views as it is the shell of the toaster which carries the improved cord holder.

The improved cord holder defines a trough extending entirely about the toaster and has side walls 4 and end walls 5 which may be formed integral with the side and end walls 6 and 7 of the toaster shell as shown in Figures 1 through 5 or formed integral with the bottom 8 of the toaster as shown in Figures 6 and 7. End portions 4' of the side walls are curved to extend towards the end walls and are welded or otherwise secured in abutting engagement with side edges of the end walls. In effect these end portions of the side walls 4 form portions of the end walls of the cord holder and since they are curved as shown in Figures 1 and 4 they cause the side and end walls to merge into each other. A bead 9 extends along the upper edge of the walls of the trough to provide a smooth finish and also eliminate danger of cracking and the walls are curved vertically as shown in the sectional views so that they are bowed outwardly. This imparts a modernistic effect to the toaster and adds to its appearance. One end wall of the cord holder carries an outwardly projecting cup-shaped portion 10 forming a pocket open at its top and inner side and adapted to receive the terminal plug 11 of the power cord 12 after the cord has been wrapped about the toaster. When the toaster is not in use the cord is wrapped about it in a coil having its convolutions disposed one over another with the lower convolution resting upon the bottom 13 of the trough and since the terminal plug is disposed vertically in the pocket 10 and practically entirely housed therein except for its prongs 14, the plug will be not only prevented from accidentally slipping out of the pocket but also almost entirely concealed from view. As the prongs project upwardly as shown in Figures 2 and 3 they may be easily grasped when the plug is to be extracted from the pocket and the cord drawn out of the trough for use. The fact that the walls of the trough are bulged outwardly provides ample room in the trough for the cord as the cord is wrapped about the toaster and the convolutions thrust downwardly into the trough. The beaded edges of the walls of the trough permit the power cord to be pulled from the trough or thrust downwardly into the same without danger of the insulation becoming worn or frayed and likelihood of a short circuit due to exposed wires will be eliminated.

From the foregoing description of the construction of our improved device, the operation thereof and the method of applying the same to use, will be readily understood. It will be seen that we have provided a simple, inexpensive and efficient means for carrying out the objects of the invention and while we have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In an electric toaster including a shell for enclosing a heating unit, the shell having an opening at its top for insertion of bread to be toasted, and a power cord for the heating unit; an upstanding wall formed integral with and extending outwardly and upwardly from the bottom of the toaster in spaced relation to walls of the shell and together therewith forming a trough for holding the power cord when the toaster is not in use, the upstanding wall having a portion bulged outwardly to form a pocket open at its top and at its inner side and constituting means to receive and hold the terminal plug of the power cord after the cord has been wrapped about the toaster shell within the trough.

2. In an electric toaster including a shell for enclosing a heating unit, the shell having an opening at its top for insertion of bread to be toasted, and a power cord for the heating unit; an upstanding wall surrounding the shell and spaced outwardly therefrom and together with the shell forming a trough for holding the power cord when the toaster is not in use, the trough being provided with an outstanding pocket constituting means for holding the terminal plug of the power cord after wrapping the cord about the shell within the trough.

3. In an electric toaster including a shell for completely enclosing a heating unit, the shell having an opening at its top for insertion of bread to be toasted, and a power cord for the heating unit; an upstanding wall surrounding the shell and spaced outwardly therefrom and cooperating with the shell to form a trough for holding the power cord when the toaster is not in use, the trough being open at its top whereby the cord may be deposited within the trough as it is wrapped about the shell.

ARTHUR C. HEISE.
MILLARD W. JACOBI.